May 22, 1928.
G. R. MEYERCORD
1,671,084
JOINT FILLER IN ANGLE OF PLYMETL WALL
Filed June 6, 1927
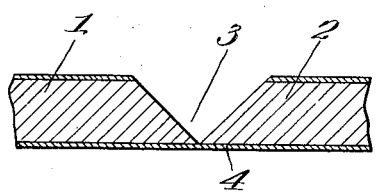
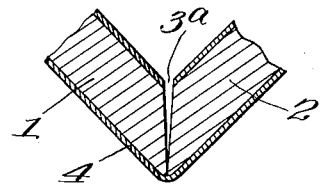
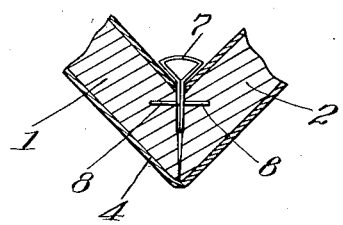
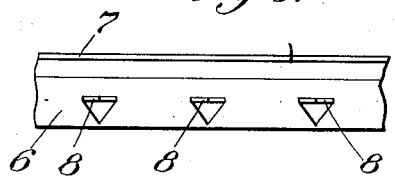
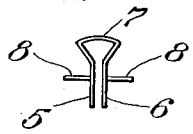
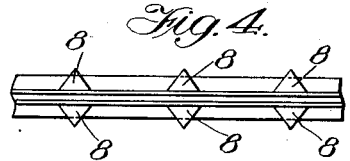
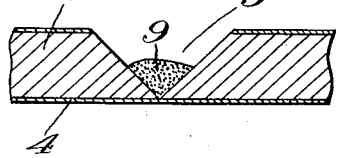
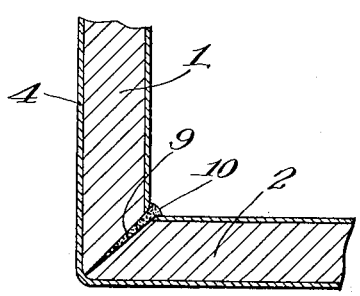
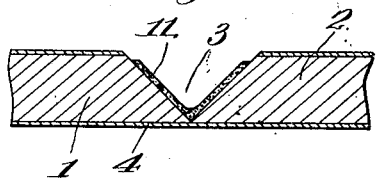
Inventor:
George R. Meyercord,
By Wm. F. Freudenreich
Atty.

Patented May 22, 1928.

1,671,084

UNITED STATES PATENT OFFICE.

GEORGE R. MEYERCORD, OF CHICAGO, ILLINOIS, ASSIGNOR TO HASKELITE MANUFACTURING CORPORATION, A CORPORATION OF NEW YORK.

JOINT FILLER IN ANGLE OF PLYMETL WALL.

Application filed June 6, 1927. Serial No. 196,704.

Shells of various kinds, as for example, for cabinets, vaults, truck bodies, are commonly made of so-called plymetl, which is metal sheathed lumber; V-shaped grooves being cut into and through the core members from the inner side, while the outer metal sheathing is left intact. Under some conditions the finish of the corners may be completed by the mere bending of the lumber. Sometimes, however, the corner joints require special treatment. Thus, if the nature of the structure is such that there is a tendency for the sides to bulge in service, the ends of the core members will tend to spread apart on the inner sides of the angles, leaving objectionable open joints. Again, if the angle of the V-shaped grooves is exactly such as to produce the desired exterior angle when the lumber is bent and the ends of the cores are in contact with each other, the resiliency of the metal sheathing will tend to cause the adjacent wall portions to spring out of their ideal relative positions and leave a more or less open joint and an inaccurate exterior angle. The angle of the V-shaped grooves is therefore in practice made somewhat greater than that theoretically required to bring the adjacent wall sections at the desired angle when the grooves are closed, thus permitting the metal sheathing to spring and bring the walls at the proper angle to each other. In this latter case slightly open joints on the inner side of the structure will result. These open joints are objectionable for the reason that they produce a weakness in the structure, even if they should be so located as not to be objectionable for any other reason.

The object of the present invention is to overcome the above noted objections to corner constructions in so-called plymetl structures.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a section through a metal-sheathed panel at right angles to the length of a V groove along the line of bending to produce a corner; Fig. 2 is a view similar to Fig. 1, showing the two sections on opposite sides of the groove occupying their final relative positions in a finished structure, the gap between the ends of the core being exaggerated; Figs. 3, 4 and 5 are respectively a side view, a bottom plan view, and an end view of a sheet metal filling strip for the open joint shown in Fig. 2; Fig. 6 is a view similar to Fig. 2, showing the filling strip in place; Fig. 7 is a view similar to Fig. 1, illustrating the application of asphalt or the like to the V groove before the bending operation; Fig. 8 is a view similar to Fig. 7, showing the condition of the panel at the end of the bending operation; and Fig. 9 is a view similar to Figs. 1 and 7, illustrating the application of glue or cement to the cut faces of the core members forming the sides of a groove.

Referring to the first six figures of the drawing, 1 and 2 represent two core sections of a piece of metal-sheathed lumber, separated from each other by a V-shaped groove 3 that extends through one face of the lumber down to the metal sheathing 4 on the opposite face. The angle of the groove is made slightly greater than the angle at which the panel sections are to stand relatively to each other when the panel is bent along the line of the bottom of the groove to close the groove. When the panel is bent to bring the two sections at the proper angle to each other, the groove being first completely closed so as to compensate for the spring of the metal, there will remain a narrow V groove $3^a$ as shown in Fig. 2.

The V groove $3^a$ may be closed and a smooth finish given to the corner on the inner side by means of the filler strip shown in Figs. 3, 4 and 5. The filler strip may consist of a strip of sheet metal, conveniently steel, folded upon itself along a longitudinal central line to provide two parallel wings 5 and 6 joined by the tubular bead 7, the transverse width or thickness of the bead being greater than the thickness of the device through the wings. The metal of the wings is punched outwardly, at approximately right angles to the plane thereof, to form prongs 8.

In using the filling strip, it is dropped into the groove, preferably during the process of bending the panel, so that as the groove is closed, the tubular bead lies in the angle between the inner faces of the two wall or panel sections, while the prongs are driven into the end faces of the core members. The underside of the bead is preferably made flat on both sides of a central longitudinal plane, the flat faces normally lying at an angle to each other slightly less than the angle to be formed between the two panel sections. Consequently as the ends of the cores close on the filling strip, the wings of the latter are pressed together, increasing the angle between the flat under faces of the bead, and causing these faces to lie snugly against the inner surfaces of the panel sections. Then, if the top of the bead is rounded more or less, a smooth interior corner would be obtained, the joint will be completely closed, and will remain closed even though the adjacent panel sections should bulge outwardly somewhat in service.

In some cases, a little hot asphalt is poured into the groove, as indicated at 9 in Fig. 7, before the bending operation. As the groove is closed, the asphalt is compressed and squeezed outwardly therefrom leaving, if desired, a small bead 10 in the inner angle of the corner. When the asphalt hardens it adds great mechanical strength to the joint, as well as closing the joint and producing a smooth inner corner.

In some cases a glue or a cement may be applied to the sides of the V groove, as indicated in Fig. 9, before the bending operation. When the panel is bent, the excess glue or cement is squeezed out, leaving the joint filled with a compacted body that later becomes hard and adds to the strength and rigidity of the corner.

While I have illustrated and described with particularly only a few simple preferred forms of my invention, I do not desire to be limited to details so illustrated and described; but intend to cover all forms and arrangements coming within the definitions of my invention constituting the appended claims.

I claim:

1. A structure comprising two core members arranged at an angle to each other and an outer metal sheathing glued to said core members and extending continuously from one to the other past the corner between them, the adjacent ends of the core members being spaced a short distance apart, and a filler in the space between the ends of said core members, said filler projecting out through said space and extending laterally over the adjacent marginal portions of the core members.

2. The method of forming a closed joint between the ends of panel sections on opposite sides of a V groove in a metal sheathed panel having a V groove extending through one face down to the metal, which consists in placing in the groove a yieldable element and compressing the same by swinging the sections of the panel on opposite sides of the groove toward each other.

3. A structure comprising two core members arranged at an angle to each other and an outer metal sheathing glued to the core members and extending continuously from one to the other past the corner between them, and a metal filling strip arranged between the meeting ends of the core members and having a bead lying in the angle between the inner faces of the core member.

4. A structure comprising two core members arranged at an angle to each other and an outer metal sheathing glued to the core members and extending continuously from one to the other past the corner between them, and a metal filling strip lying between the meeting ends of the core members and having laterally projecting prongs driven into said end.

5. A structure comprising two core members arranged at an angle to each other and an outer metal sheathing glued to the core members and extending continuously from one to the other past the corner between them, and a filling strip consisting of sheet metal folded upon itself to form two wings lying in the space between the meeting ends of said core members, said wings having struck therefrom prongs that are driven into the ends of said core members.

In testimony whereof, I sign this specification.

GEORGE R. MEYERCORD.